Patented July 11, 1939

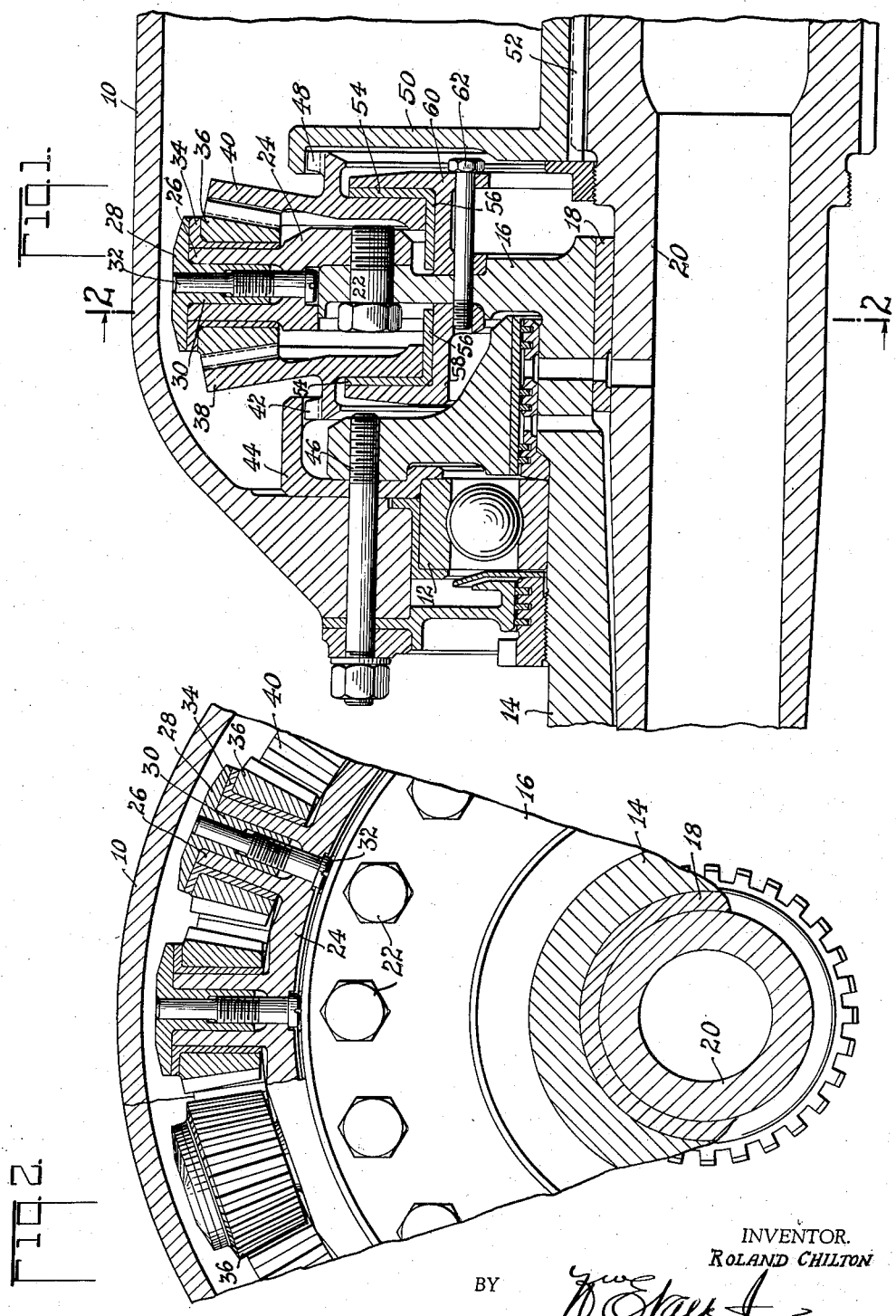

2,165,462

UNITED STATES PATENT OFFICE 2,165,462

REDUCTION GEAR

Roland Chilton, Ridgewood, N. J., assignor, by mesne assignments, to Wright Aeronautical Corporation, Paterson, N. J., a corporation of New York Application July 8, 1937, Serial No. 152,491

7 Claims. (Cl. 74—303)

This invention relates to reduction gears of the planetary bevel gear type, the embodiment of the drawing illustrating a design for a large aircraft engine.

The general type of gear is broadly old since it comprises a driving bevel gear, driven by the engine crankshaft, a fixed bevel gear held from rotation in the housing and planetary bevel pinions carried by the propeller or driven shaft. In the showings the driving and fixed gears have equal pitch cone angles wherefore the planet axes are at right angles to the shaft axis and the ratio is 2:1.

In the prior art it has been the practice to use only three planet pinions and to equip the driving and fixed bevel gears with spherical or self aligning thrust means, it having been taught that this provision was necessary to insure uniform load distribution between the teeth. This invention teaches that, with suitable proportions as to relative flexibility of the parts, and with suitable control of manufacturing tolerances, there is no need to limit this design to three pinions but on the contrary that there are very great advantages in employing a very great number of pinions.

It will be obvious that, with a given torque to be transmitted, the load per tooth is inversely proportional to the number of pinions, and in the specific design shown, 18 pinions are employed, giving 6 times the power capacity, with any given size and weight of driving and fixed gears, as compared with a conventional 3 pinion gear. It will also be understood that in this type of gear the ratio is determined by the relative size of these driving and fixed gears and is quite independent of the pinion size.

Accordingly, objects of the invention are to produce a design wherein the operating deflections are utilized to assist in the equal distribution of the tooth loads whereby a very large number of pinions may be utilized, giving a great reduction in the weight and bulk required for a given power. Other objects and advantages will be obvious from, or will be pointed out in the following description with reference to the drawing in which:

Fig. 1 is a fragmentary axial section through a gear according to the invention, and Fig. 2 is a fragmentary section on the line 2 of Fig. 1.

In the drawing 10 designates a conventional engine nose in which there is rotatably mounted with a conventional thrust bearing 12, a hollow propeller shaft 14 having at its right hand end a large flange 16. The propeller shaft unit is also supported on the usual bearings, one of which is shown at 18, on the usual crankshaft extension 20. Secured to the flange 16 by bolts 22 is a spider 24 equipped with, in this instance, 18 integral hollow journals 26. Thrust washers 28 have shanks 30 telescoped in the hollow journals 26 and secured by screws 32. Floating thrust washers and bushings 34 engage the respective journals 26 and the fixed thrust washers 28, and carry the bevel pinions 36. Engaged with these pinions 36 are two similar side gears 38—40, the former being secured from rotation in the housing by splines 42 of a member 44 anchored by the bolts 46 and the latter by similar splines 48 engaging a driving member 50 splined on the crankshaft 20 at 52. The splines 42—48 give axial and angular freedom to the gears 38—40, these gears being floatably located upon the disc 16 by combined thrust and annular bearing elements 54—56 engaged by suitable rings 58 and 60 secured to the disc 16 by bolts 62. It will now be seen that the flange 16, the spider 24, the pinions 36 and the fixed and driving gears 38 and 40 with the thrust bearings 54, 56 comprise a unitary assembly having its own integral alignment independent of any possible axial or angular movement or misalignment between the driving member 50 of the crankshaft and the anchoring member 44 of the housing 10.

It is characteristic of this design, and is in fact one of its main objectives, that the unit tooth loads are very low compared with the current practice (which utilizes three pinions) and it is a further advantage of this structure that within a given housing diameter, the main gears 38—40 may be of bigger diameter than in gears used with a few relatively large pinions. Thus the thrust reactions of each pinion on the side gears 40—38 are relatively small and accordingly the gears 38 and 40, may be made much lighter than is possible where the entire driving effort is concentrated on only three tooth contacts, as in conventional aeronautical bevel type reduction gears. It will be seen that each of these gears 40 and 38 comprises an annulus supported near its inner perimeter by the thrust bearings 54 and loaded at its outer perimeter by the thrust reactions of each of the evenly spaced pinions. With modern equipment and indexing features, it is possible to hold the tolerance on the spacing of the pinion journals 26 within one thousandth of an inch and with ground gears the tooth spacing errors will be but a fraction of this amount. Accordingly, very slight local deflection of the flat gears 40—38 will compensate for manufacturing errors and will automatically affect distribution of the tooth loads. The errors in tooth load distribution depend upon the relationship between the manufacturing spacing errors and the inherent elasticity of the side gears to yield flat-wise to the local loads applied by the thrust reactions of each pinion tooth.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A gear assembly for a reduction gear unit comprising a shaft having a flange integral therewith, a spider annulus secured to the flange, said spider annulus including pinion journals and pinions thereon, bearing members secured to the flange on each side thereof, and bevel gears floatingly carried by said bearing members and engaging opposite sides of said pinions.

2. A gear assembly for a reduction gear unit comprising a shaft having a flange integral therewith, a spider annulus secured to the flange, said spider annulus including pinion journals and pinions thereon, bearing members secured to the flange on each side thereof, bevel gears floatingly carried by said bearing members and engaging opposite sides of said pinions, said gear unit including bearing means for said shaft, and driving and reaction elements flexibly drivably connected to the respective gears.

3. In a gear assembly, a flange, a spider annulus secured thereto having journals and pinions mounted on the journals, bearing annuli on each side of the flange, common means for securing both said annuli to the flange, and bevel gears floatingly carried on respective annuli and engaging said pinions.

4. In a reduction gear for an engine having a housing, a crankshaft therein, a hollow propeller shaft piloted on the crankshaft, the propeller shaft having an integral flange, an annular spider member secured to the outer edge of the flange having a large plurality of pinion journals extending therefrom, pinions on said journals, bevel gears on each side of said spider annulus in engagement with said pinions, bearings for said gears on each side of said flange, common means securing said bearings to said flange, a flexible driving connection from said crank shaft to one said bevel gear and a flexible reaction connection from said housing to the other said bevel gear.

5. A gear assembly comprising a power shaft, a flange concentric with the shaft having radially extending pinion journals at the flange edge, pinions on said journals, an annular bevel gear on each side of said flange engaging said pinions, and bearing means for said gears secured to said flange.

6. A gear assembly comprising a power shaft, a flange concentric with the shaft having radially extending pinion journals at the flange edge, pinions on said journals, an annular bevel gear on each side of said flange engaging said pinions, bearing means for said gears secured to said flange, and a flexible driving connection from said shaft to one of said bevel gears.

7. A reduction gear comprising a housing having a power shaft therein, an annular flange having a hollow shaft thereon extending through said housing, the hollow shaft being piloted on the power shaft, radial journals extending from the flange edge, pinions on said journals, a gear on each side of the flange engaging said pinions, bearing means secured to opposite sides of the flange on which said gears are floatingly borne, and flexible driving connections between one gear and the housing and between the other gear and the power shaft.

ROLAND CHILTON.